United States Patent [19]
Haissig

[11] Patent Number: 5,999,556
[45] Date of Patent: *Dec. 7, 1999

[54] ELECTRIC ARC FURNACE THAT USES POST COMBUSTION

[75] Inventor: Manfred Haissig, Concord, N.C.

[73] Assignee: Fuchs Systems, Inc., Salisbury, N.C.

[*] Notice: This patent is subject to a terminal disclaimer.

[21] Appl. No.: 09/296,951

[22] Filed: Apr. 22, 1999

Related U.S. Application Data

[63] Continuation of application No. 09/062,055, Apr. 17, 1998, Pat. No. 5,943,360.

[51] Int. Cl.$^6$ ....................................................... F27D 17/00
[52] U.S. Cl. ........................... 373/9; 373/8; 373/80; 266/156; 75/10.36
[58] Field of Search ........................ 373/2, 8, 9, 60, 373/71, 72, 74, 75, 77, 78, 79, 80; 266/44, 156, 217, 265; 75/10.36, 10.12

[56] References Cited

U.S. PATENT DOCUMENTS

| | | | |
|---|---|---|---|
| 3,216,714 | 11/1965 | Eibl et al. | 266/34 |
| 3,441,651 | 4/1969 | Viens et al. | |
| 3,534,143 | 10/1970 | Carlson et al. | |
| 3,588,306 | 6/1971 | Kawabe | |
| 3,679,806 | 7/1972 | Reth et al. | |
| 3,839,017 | 10/1974 | Schempp | |
| 3,997,711 | 12/1976 | Stark et al. | |
| 3,999,977 | 12/1976 | Kolb et al. | |
| 4,077,614 | 3/1978 | Udo et al. | |
| 4,740,242 | 4/1988 | Nakamura et al. | |
| 5,065,985 | 11/1991 | Takahashi et al. | |
| 5,392,312 | 2/1995 | Bernet et al. | |
| 5,410,566 | 4/1995 | Steins et al. | |
| 5,444,733 | 8/1995 | Coassin et al. | |
| 5,572,544 | 11/1996 | Mathur et al. | |
| 5,590,150 | 12/1996 | Ogushi et al. | |
| 5,590,151 | 12/1996 | Forestier | |

FOREIGN PATENT DOCUMENTS

| | | |
|---|---|---|
| 1936 649 | 2/1970 | Germany. |
| 41-2683 | 2/1966 | Japan. |

*Primary Examiner*—Tu Ba Hoang
*Attorney, Agent, or Firm*—Allen, Dyer, Doppelt, Milbrath & Gilchrist, P.A.

[57] ABSTRACT

An electric arc furnace comprises a closed melting vessel and includes means for charging metal to be molten into the melting vessel. At least one electrode extends into the melting vessel and generates an electric arc and forms a molten metal bath. At least one oxygen lance can be extended into the melting vessel for injecting oxygen into the molten metal bath and create a reaction where the carbon monoxide is generated. Gas is exhausted from the melting vessel and the carbon monoxide gas concentration of the exhaust gas is measured. A post combustion chamber receives the exhaust gas and provides post combustion of the exhaust gas. Post combustion oxygen is injected into the melting vessel in an amount sufficient to provide post combustion based on the amount of oxygen necessary for post combustion of the exhaust gas and the post combustion chamber.

22 Claims, 9 Drawing Sheets

ELECTRIC ARC FURNACE THAT USES POST COMBUSTION

This application is a continuation of Ser. No. 09/062,055 filed on Apr. 17, 1998, now U.S. Pat. No. 5,943,360.

FIELD OF THE INVENTION

This invention relates to electric arc furnaces, and more particularly, to electric arc furnaces that use a post combustion process.

BACKGROUND OF THE INVENTION

Electric arc furnaces are increasingly used for melting and refining iron or steel, and especially scrap metal. However, these furnaces are very energy intensive and typically require at least one high energy electrode and a high pressure oxygen lance to obtain and maintain a molten metal bath. Because of the large amounts of energy used in an electric arc furnace, steel mill operators are increasingly looking for ways to use all potential energy during the steel making process.

Recently, electric arc furnace operators have used post combustion technology that was originally developed for basic oxygen furnaces many years ago. During the steel making process, oxygen reacts with the carbon in the scrap and/or molten steel and forms carbon monoxide, which bubbles out of the molten metal and then into the exhaust gas. In a post combustion process, secondary oxygen is injected into the melting vessel and reacts with the generated carbon monoxide and forms carbon dioxide. Also, any hydrogen and hydrocarbons could also react with secondary oxygen in a post combustion reaction and form water and carbon dioxide. All these reactions are an exothermic reaction and release energy to be used in the steel making process.

Various types of post combustion systems have been designed. Some post combustion systems inject oxygen into the upper shell of the melting vessel, and other post combustion systems inject oxygen into the foamy slag. Still others inject the post combustion oxygen just above the foamy slag. In order to ensure adequate control over oxygen flow, some of the post combustion systems measure the amount of carbon monoxide present in the melting vessel, such as the generated gas, and depending on the carbon monoxide content, adjust any oxygen injectors to vary the amount of oxygen injected into the melting vessel.

Various systems attempt to improve upon post combustion systems used in steel making, especially with electric arc furnaces. One post combustion system is disclosed in U.S. Pat. No. 5,572,544 to Mathur, et al., where a gas stream is formed within the electric arc furnace, which concentrates the carbon monoxide. Post combustion oxygen is injected into the gas stream where the carbon monoxide is concentrated. However, the sampling of any exhaust gas to determine what post combustion oxygen is required is time consuming and does not operate in real time.

Additionally, many post combustion systems use standard oxygen injectors that can be subject to overheating during this exothermic post combustion processes. Some of the post combustion processes also are not as accurate because it is difficult to constantly measure the gas concentration of carbon monoxide and other gases within a melting vessel. It is also sometimes difficult to adjust oxygen burners in amounts sufficient for adequate post combustion when the gas concentration of various constituents, such as oxygen, carbon dioxide and carbon monoxide change so often during the steel making process.

SUMMARY OF THE INVENTION

It is therefore an object of the present invention to provide an electric arc furnace with a post combustion process that can operate in real time and make accurate changes to oxygen flow with little delay.

It is still another object of the present invention to provide an electric arc furnace with a post combustion system having an improved oxygen nozzle that can be cooled during the post combustion process.

The present invention now provides an electric arc furnace with a post combustion system having a post combustion chamber that receives exhaust gas and provides post combustion of the exhaust gas. Based upon the post combustion of the exhaust gas, and the measured concentration of carbon monoxide, and in some instances, other input variable such as lime content, oxygen, carbon monoxide and other gases, the amount of oxygen injected during post combustion in the melting vessel is adjusted for the most beneficial and efficient post combustion process.

In accordance with the present invention, an electric arc furnace comprises a closed melting vessel, including means for charging metal to be molten into the melting vessel. At least one electrode extends into the melting vessel for generating an electric arc and forming a molten metal bath. At least one oxygen lance can be extended into the melting vessel for injecting oxygen into the molten metal bath and increasing the reaction where carbon monoxide is generated.

Gas is exhausted from the melting vessel and the carbon monoxide gas concentration of the exhaust gas is measured. A post combustion chamber receives the exhaust gas and provides post combustion of the exhaust gas. Post combustion oxygen is injected into the melting vessel in an amount sufficient to provide post combustion based on the amount of oxygen necessary for post combustion of the exhaust gas in the post combustion chamber.

Additionally, the temperature of the exhaust gas is measured before entering the post combustion chamber. The gas can be exhausted from the post combustion chamber, and the invention further comprises means for measuring the temperature and carbon monoxide gas concentration after exhaustion of the gas from the post combustion chamber to determine the sufficiency of post combustion. Means also exhausts gas from the post combustion chamber back into the melting vessel.

In accordance with another aspect of the present invention, a plurality of water-cooled oxygen injectors are used and the post combustion oxygen is injected through water-cooled oxygen injectors. Each of the water-cooled oxygen injectors comprises a substantially rectangular configured housing having an oxygen chamber and means for passing oxygen into the oxygen chamber in the form of an oxygen inlet. A plurality of oxygen orifices are included through which oxygen passes outward from the oxygen chamber. A water cooling chamber surrounds the oxygen chamber.

The water-cooled oxygen injector is formed as a rectangular configured housing having a front and rear wall. The rear wall is formed similar to a concave dish, and the rear wall covers the open concave area. A central conduit wall is formed within the medial portion of the housing and extends from the rear to front wall, thus forming the oxygen chamber, which is bounded by the conduit wall. The void surrounding the chamber formed by the conduit wall comprises the water cooling chamber and includes an inlet and outlet on the rear wall. The housing can be placed within a water-cooled panel, and an appropriate flow valve controller attaches between the oxygen inlet and a source of oxygen.

In still another aspect of the present invention, means injects argon into the melting vessel and further comprises means for measuring the amount of argon in the exhaust gas to determine the exhaust gas volume that will enter the post combustion chamber. Means also measures the carbon dioxide and oxygen before entering the post combustion chamber. The electric arc furnace further comprises means for measuring the concentration of carbon monoxide gas exhausted from the post combustion chamber. The electric arc furnace also further comprises a burner for heating the exhaust gas within the post combustion chamber.

In still another aspect of the present invention, the electric arc furnace comprises a melting vessel having a top opening. A roof is positioned over the top opening and a shaft in the roof permits charging of metal into the melting vessel. At least one electrode extends to the roof into the melting vessel for generating an electric arc and forming a molten metalbath. A slag door portion defines a slag discharge opening through which slag can be discharged from the melting furnace.

A slag free area is formed by an arcuate configured water-cooled panel positioned above the slag door. At least one oxygen lance is extended through the slag door portion into the melting vessel for injecting oxygen into the molten metal bath to create a reaction where carbon monoxide is generated. Exhaust gas is exhausted from the melting vessel for separate post combustion. The carbon monoxide gas concentration of the exhaust gas is measured, and based upon the post combustion of exhaust gas and the measured gas concentration, the post combustion oxygen is injected into the melting vessel in an amount sufficient to provide post combustion.

In a method aspect of the present invention, the method comprises the steps of generating an electric arc by at least one electrode extending through the roof of the melting vessel of the electric arc furnace to form a molten metal bath. The method further comprises extending an oxygen lance into the melting vessel and injecting oxygen into the molten metal bath to create a reaction where carbon monoxide is generated.

The method further comprises exhausting gas from the melting vessel into the post combustion chamber and injecting post combustion oxygen into the post combustion chamber based on the measured gas concentration in amounts sufficient for post combustion. Post combustion oxygen is injected into the melting vessel in an amount sufficient to provide post combustion based on the amount of oxygen necessary for post combustion in the post combustion chamber. The method also comprises the step of measuring the temperature of the exhaust gas before the gas enters the post combustion chamber and adjusting the injection of post combustion oxygen based on the measured temperature. The exhaust gas from the post combustion chamber can be returned to the melting vessel.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The electric arc furnace of the present invention now includes a post combustion process that is advantageous over many prior art systems because it allows for off gas analyzing and off gas (exhaust gas) post combustion to determine the post combustion oxygen to be injected into the melting vessel. The method also provides a water-cooled oxygen injector that is relatively inexpensive to manufacture, readily replaceable, and also provides for enhanced post combustion. For purposes of background, the general description of an electric arc furnace that can be used for the present invention is described in detail followed by a general description of the post combustion process.

Figure 1:
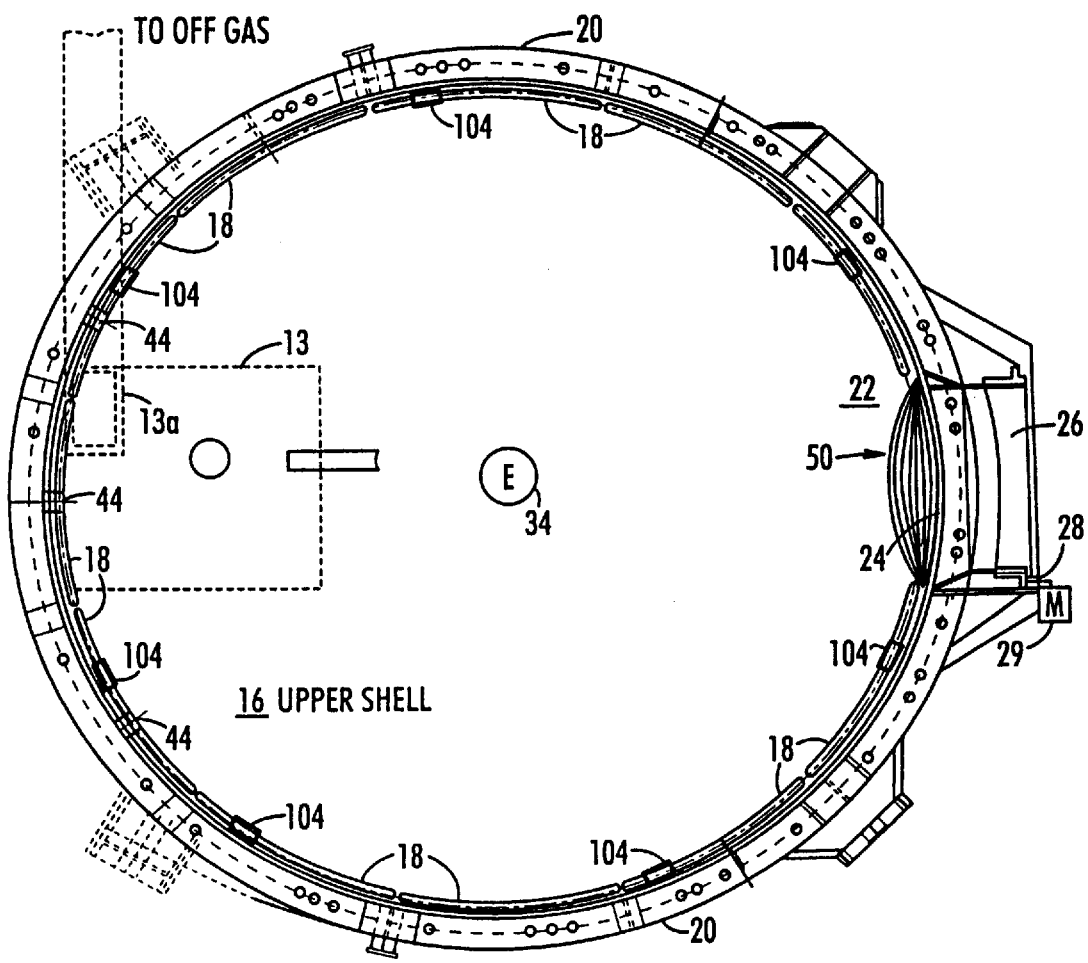
FIG. 1 is a plan view of the upper shell of the melting vessel showing the general position of injectors and the hood of a shaft that extends upward to receive scrap.

FIG. 1 illustrates an electric arc furnace of the present invention, illustrated generally at 10, which includes a melting vessel 12. The furnace is illustrated as a shaft furnace having a shaft 13 (FIG. 8) that allows scrap charging through the shaft, and exhaust gas removal through a hood 13a at the top of the shaft. The invention is not limited to shaft furnaces, however, and can be used with many different types of electric arc furnaces, including furnaces with removable roofs. An inside wall surface 14 is defined by cooling panels. Typically, the electric arc furnace 10 is cylindrically or oval configured, and can range in diameter from 15 feet to 45 feet or more, depending on the type and quantity of the desired melt.

In the portion illustrated in FIG. 1, a portion of the upper shell 16 is illustrated. A plurality of water-cooled panels are mounted to define the inside wall surface 14 of the upper shell 16, and form the cooling panels necessary for steelmaking. In some electric arc furnaces, a refractory material can be substituted for the water-cooled panels, but this is not the norm. A lower shell 17 (FIG. 12) is positioned below the upper shell 16, and usually includes a refractory material, such as brick 17a, lining the inside wall surface of the lower shell. The electric arc furnace has a top flange 20.

As illustrated, a slag door portion 22 is formed in the melting vessel 12 typically below the area formed by the upper shell 16 and water-cooled panels 18, and defines a slag discharge opening 24 through which slag can be discharged from the melting vessel 12 during a melt. A slag door 26 is positioned over the slag discharge opening 24 and is removable for exposing the slag discharge opening 24 and allowing an operator to view the melt during furnace operation, and position an oxygen lance (not shown) through the slag discharge opening 24 into the melting vessel 12. The slag door 26 can be moved to expose the slag discharge opening 24 by a conventional means known to those skilled in the art, such as an illustrated sliding mechanism 28 or other means.

Figure 2:
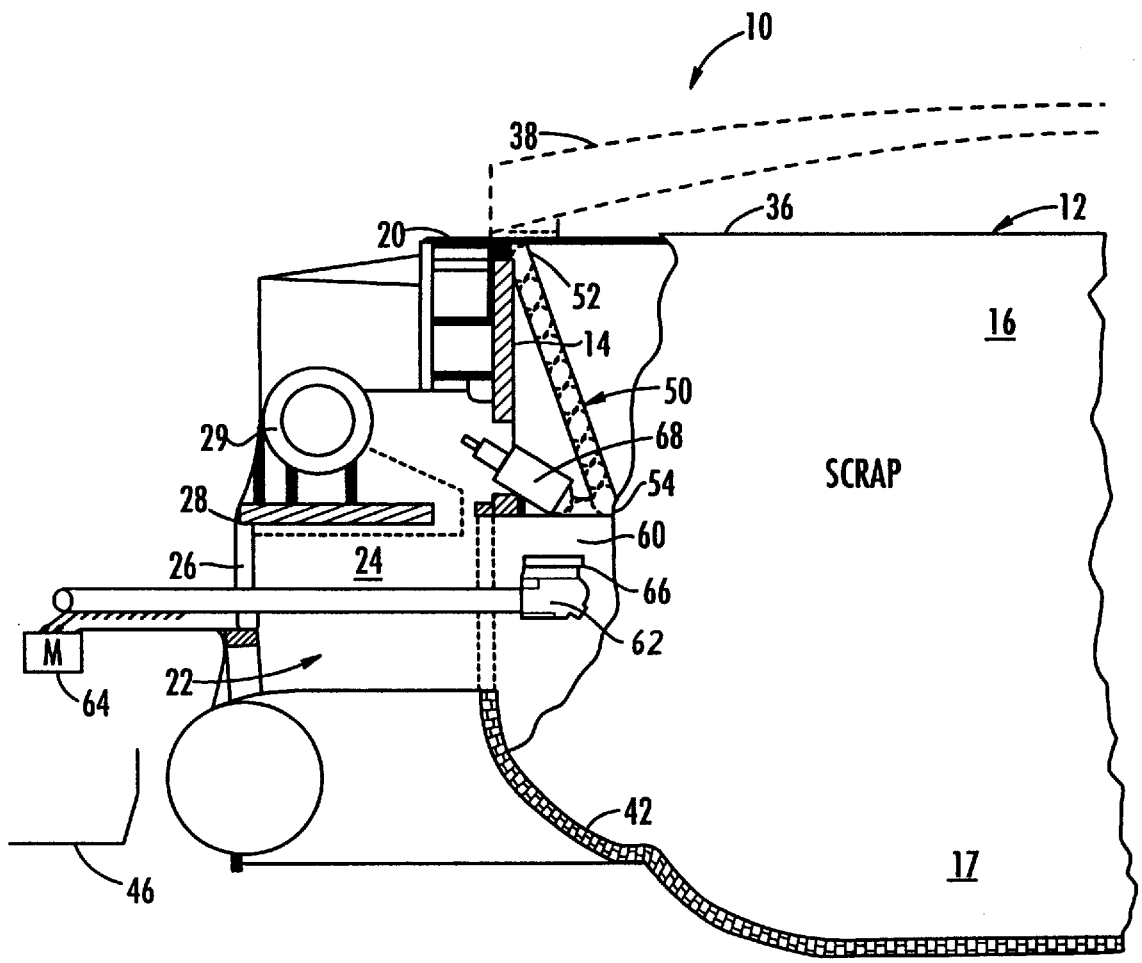
FIG. 2 is a schematic side sectional view of a portion of the electric arc furnace, showing a portion of the melting vessel and slag door portion, and an arcuate configured water-cooled panel positioned above the slag door portion, and an oxygen lance positioned within the scrap free area.

As also shown in FIG. 2, the electric arc furnace 10 includes an upper shell 16 and a lower shell 17. The upper shell 16 includes a top opening 36. A roof 38 is positioned over the top opening 36.

One or more electrodes 34 extend into and through the roof. The roof 38 includes the shaft 13 and hood 13a and permits the charging of scrap through the shaft 13 into the melting vessel 12. The electric arc furnace 10 is typically about 15 to 40 feet in diameter, but varies depending on the design. The lower shell 17 is positioned below the upper shell and includes a refractory lining 42, typically formed from brick or other refractory material. The upper shell 16 has a plurality of water-cooled panels 18 that define the inside wall surface 14 of the melting vessel 12. As noted before, the upper shell 16 can include a refractory material instead of the water-cooled panels.

As is well known to those skilled in the art, burners 44 are positioned at predetermined locations around the inside wall surface and provide the preheating to aid in melting the scrap. Also, in accordance with the present invention, a plurality of water-cooled oxygen injectors are positioned at predetermined locations around the inside wall surface and can provide primary oxygen flow and secondary oxygen flow for post combustion. The water-cooled panels defining the inside wall surface 14 of the upper shell 16 provide the cooling means necessary for electric arc furnace operation. Water-cooled panels (not shown) can also be positioned on the roof 38 of the electric arc furnace as is well known to those skilled in the art.

A slag door portion 22 is positioned at the side of the melting vessel 12 and defines a slag discharge opening 24 through which slag can be discharged from the melting vessel 12 during a melt. As shown in FIGS. 1 and 2, the movable slag door 26 covers the slag discharge opening 24 formed in the slag door portion. A slag pit 46 is positioned outside the melting vessel 12 under the slag discharge opening 24 and collects the slag discharged through the slag discharge opening 24 during the melt. The slag door 26 can be mounted on a sliding mechanism 28 or appropriate means and moved by an appropriate motor mechanism 29 or other suitable means, even by manual operation.

As shown in FIGS. 1 and 2, an arcuate configured water-cooled panel, illustrated generally at 50, is positioned above the slag door portion 22 and includes opposing respective upper and lower ends 52, 54 and opposing side ends 56, 58 (FIG. 3), and is positioned above the slag door portion 22 so that the lower end 54 is angled inwardly away from an adjacent inside wall surface 14 of the melting vessel 12. The side ends 56, 58 are curved toward the adjacent inside wall surface 14 of the melting vessel 12 to minimize any arcing between the opposing side ends 56, 58 and the electrode 34 extending through the removable roof 38. The unexposed side ends 56, 58 also reduce the likelihood of physical damage to the water-cooled panel.

Figure 5:
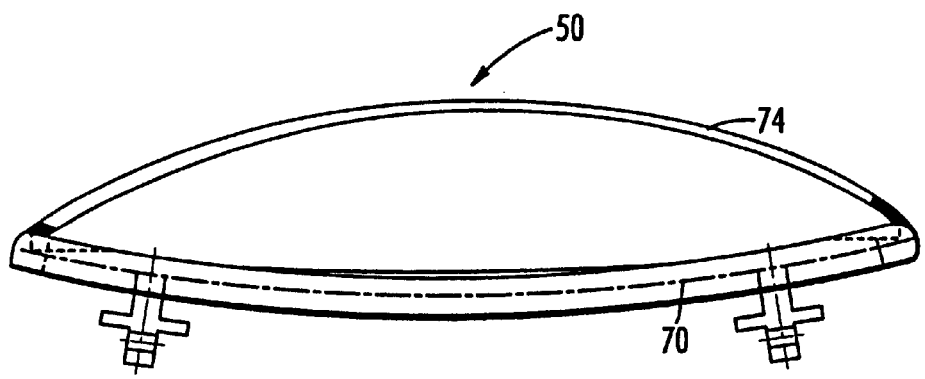
FIGS. 5–7 are sectional views taken along lines 5—5, 6—6, and 7—7 of the water-cooled panel of FIG. 4, showing the radius of curvature progressively increasing from the upper end to the lower end.
Figure 6:
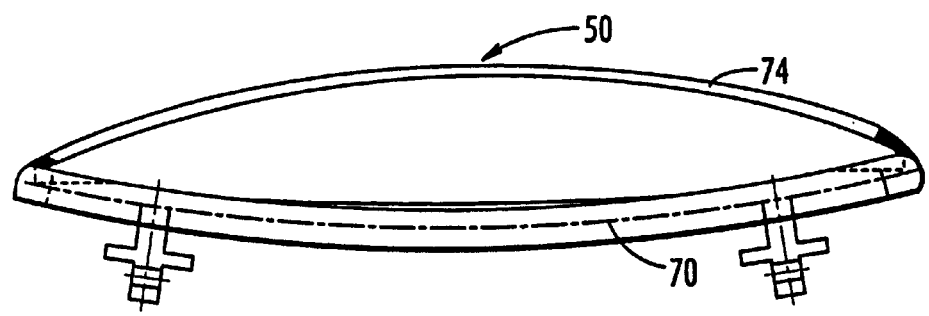
Figure 7:
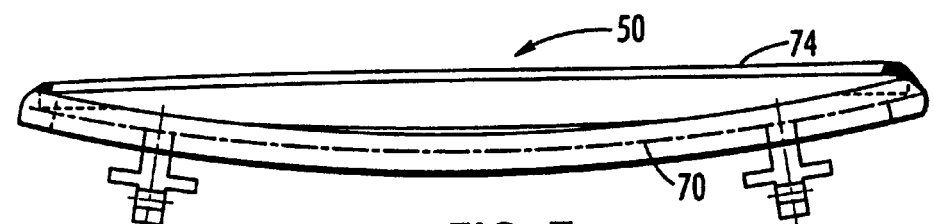

As shown in the sectional views of the arcuate configured water-cooled panel 50 in FIGS. 5–7, the panel 50 has a radius of curvature that progressively increases from the upper end 52 to the lower end 54, which is positioned inwardly of the adjacent inside wall surface 14 of the melting vessel 12. FIG. 5 illustrates the curve of the water-cooled panel 50 at its lower end 54 where it is positioned a greater distance inwardly of the adjacent inside wall surface 14 of the melting vessel 12. FIG. 6 shows the intermediate section midway between upper and lower ends 52, 54, where the curve of the water-cooled panel 50 is less than at its lower end 54. FIG. 7 shows the section view where the water-cooled panel 50 is positioned its closest distance to the adjacent inside wall surface 14 of the melting vessel 12. Thus, as shown in FIG. 1, the arcuate configured water-cooled panel 50 forms an "awning" structure that has no exposed corners.

The area immediately underneath the arcuate configured water-cooled panel 50 adjacent to the slag door portion 22 forms the scrap free area 60 in the location of the electric arc furnace known also by those skilled in the art as the "breast". As illustrated, the "awning" effect of the panel 50 maintains this area inside the furnace adjacent to the slag door portion 22 and within the slag discharge opening 24 free of slag. The slag free area 60 formed under the panel 50 also allows an oxygen lance 62 to be positioned a greater distance into the melting vessel 12. The oxygen lance 62 can be positioned on a drive assembly 64, which allows the oxygen lance to be moved during a heat through the slag discharge opening 24, into the "breast" of the furnace, without engaging slag. Because slag no longer fills the breast and slag door portion 22, a burner 66 can be positioned at the end of the oxygen lance 62, and aids scrap heating. A burner 68 can also be positioned in the area behind the water-cooled panel 50 to provide a preheating flame on the scrap to aid in melting the scrap.

Figure 3:
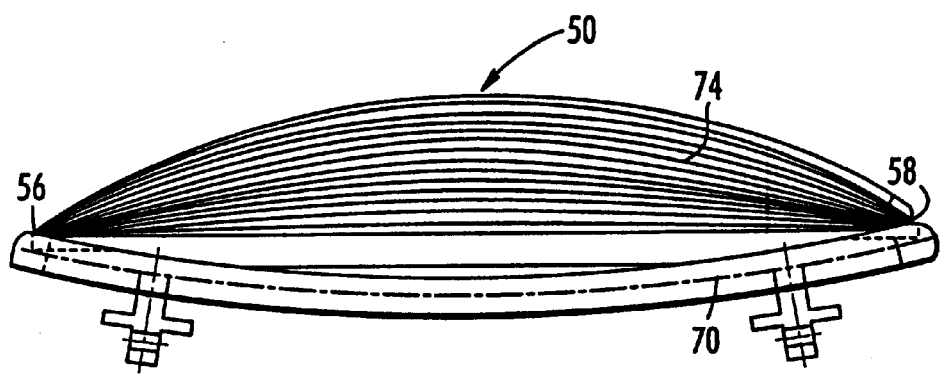
FIG. 3 is a top plan view of the arcuate configured water-cooled panel.
Figure 4:
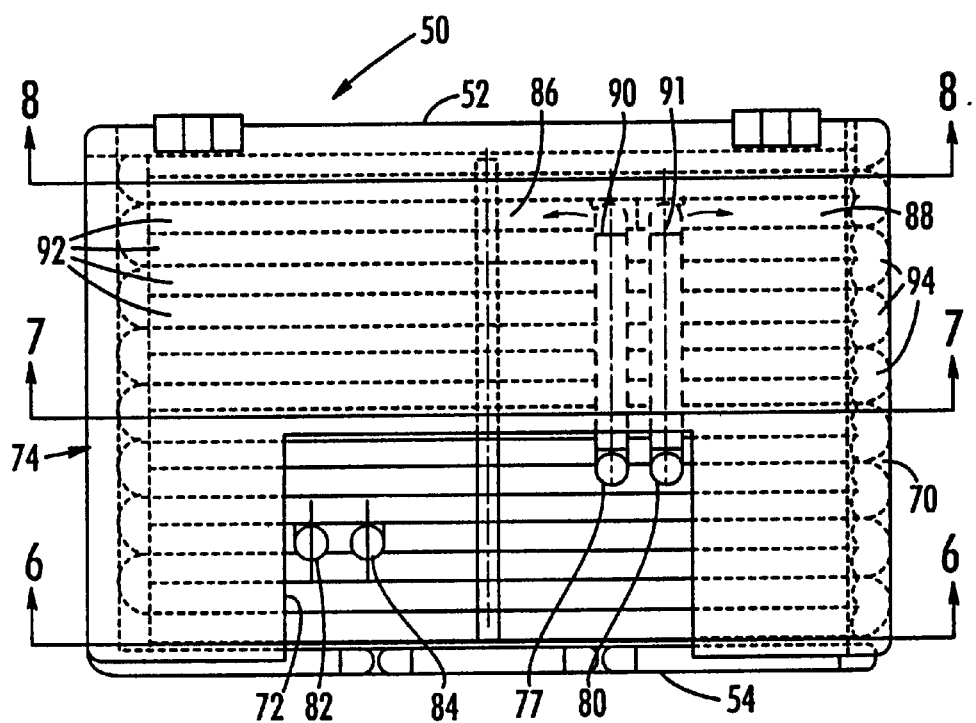
FIG. 4 is a rear elevation view of the water-cooled panel.

Referring now to FIGS. 3 and 4, greater details of the arcuate configured water-cooled panel 50 are illustrated. An arcuate configured and vertically extending base plate 70 is connected to the water-cooled panel 18 for supporting the water-cooled panel 50 along its opposing side ends 56, 58 and the upper end 52 (FIG. 2). The base plate 70 has a curvature that defines the circular outline of the furnace. The base plate 70 provides rigidity and stability to the water-cooled panel 50. A rectangular opening 72 can be formed in the base plate 70 to allow the burner 68 to extend into the scrap free area 60 behind the water-cooled panel 50 and provide heating to the scrap. The burner 68 would heat the scrap by ejecting burning heated gas at an angle into the scrap adjacent to the scrap free area.

As shown in FIG. 4, the water-cooled panel 50 also comprises a serpentine configured cooling pipe 74 (shown by the dotted lines), and includes at least one inlet and outlet formed in the cooling pipe to which cooling fluid, such as water, flows to and from the cooling pipe. In the illustrated embodiment shown in FIG. 4, the serpentine configured cooling pipe 74 includes two inlets 77, 80 and two outlets 82, 84 forming two cooling circuits indicated generally at 86 and 88. In the left inlet 78 shown in FIG. 4, the water would extend upward through an inlet pipe 90 and then flow left as shown by the arrow. The water flows downward to the left most outlet 82. Water entering the inlet 80 at the right would flow upward through the inlet pipe 91 and flow through the second circuit 88 and out the second outlet 84.

The two inlets 78, 80 and two outlets 82, 84 form two piping circuits 86, 88 that help achieve a water flow balance with the other water-cooled panels 18 positioned in the upper shell (FIG. 1). The water flow is critical through all cooling panels, and can be provided by one large source. Thus, water flow should not be impeded. Not only does the arcuate curvature of the water-cooled panel 50 help water flow, but also the two circuits 86, 88 help reduce resistance to water flow. The two piping circuits 86, 88 can be formed back-to-back.

As illustrated, the cooling pipe 74 further comprises a plurality of cooling pipe sections 92 that extend horizontally from opposing side ends 56, 58. The distance between opposing side ends is greater than the distance between opposing upper and lower ends to form a more streamlined design having a reduced number of elbow joint sections 94 at the side ends 56, 58, which also reduces the pressure drop associated with the water-cooled panel 50.

Figure 12:
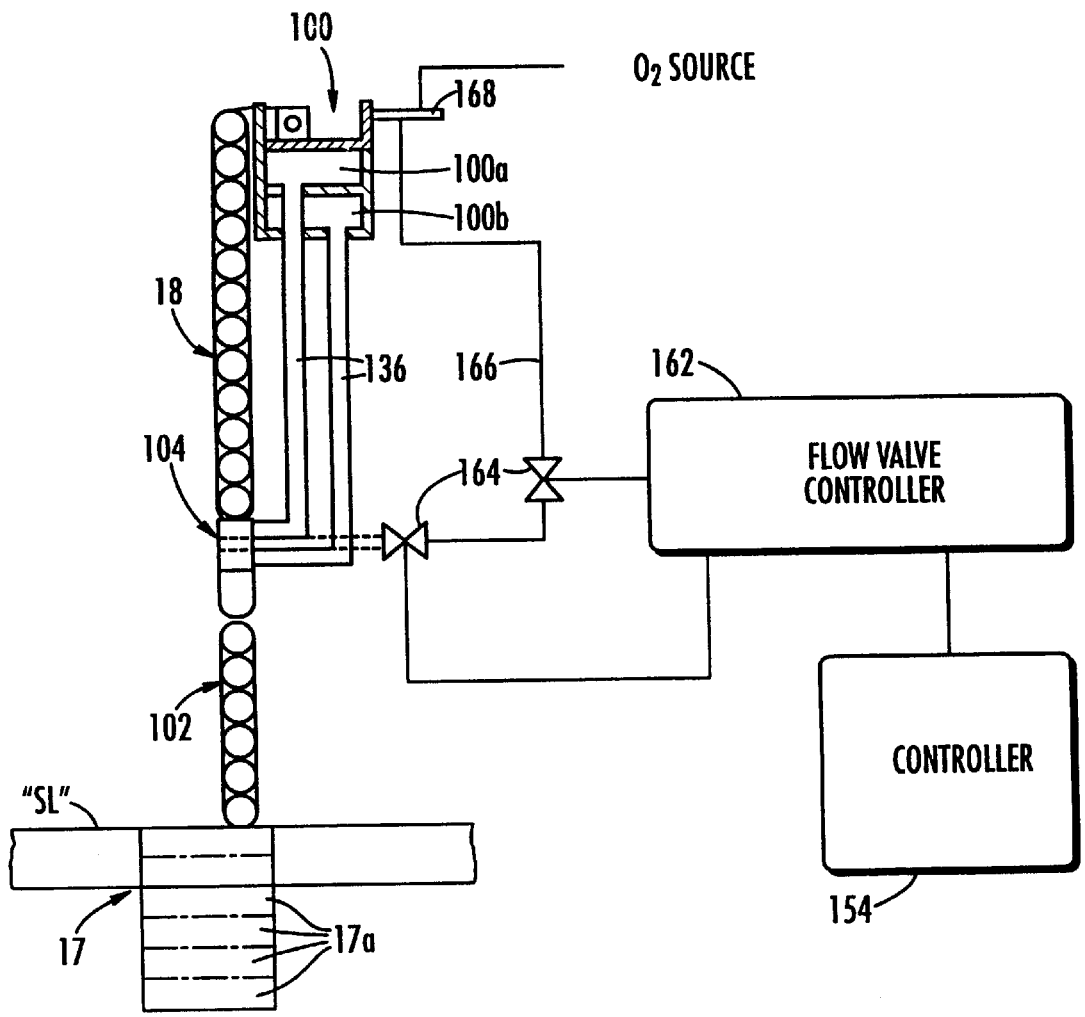
FIG. 12 is a schematic sectional view of a water-cooled panel and showing a water-cooled oxygen injector positioned in the panel, while also showing oxygen and water sources.

In the larger capacity electric arc furnaces, a water flow rate of 150 1/min.m$^2$ (3.65 gpm/ft$^2$) for a side wall water-cooled panel or 170 1/min.m$^2$ (4.14 gpm/ft$^2$) for a roof water-cooled panel should be available. For DC furnaces, an even greater water flow rate through the cooling pipe 74 should be available, typically, at least a 10–20 1/min.m$^2$ (0.25–0.5 gpm/ft$^2$) more depending on arc power and arc voltage. If too much scrap is placed in the furnace so that the distance between the scrap and roof is short, additional water is required. Water for various panels can be provided by a circumferentially extending water channel 100 formed along or under the rim or top flange 20 of the furnace (FIG. 12).

If enough water is available for these sustained flow rates, the overall quality or hardness of the water is of secondary importance. However, softer water will extend the life of a water-cooled panel.

During furnace operation, the transfer of heat through the cooling pipe 74 into the water generates steam bubbles at the inner surface of the pipe. The energy required to form these steam bubbles is extracted from the hot pipe, causing heat transfer, resulting in a cooling mechanism. The steam bubbles are transported away from the surface to prevent coagulation and the formation of larger bubbles, which would insulate the pipe from the water, reducing the cooling effect.

In that case, a deposit of calcium carbonate would be formed on the inner surface of the pipe, decreasing the heat transfer. This could cause cracking of the pipe parallel to the water flow direction.

In general, a minimum water flow velocity of 2.5 m/sec or 8 ft/sec should be sufficient to remove the small steam bubbles from the pipe surface.

The water pressure exiting the water-cooled panel should also be above 20 psi to avoid starving of individual water-cooled panels and to achieve uniform flow rates. For a given incoming water pressure, different water flow rates and pressure drops will cause panel problems if the water flow drops below the critical rate.

Three different materials can be used for the water-cooled panels. The most common material used for the panel construction is standard boiler grade type A steel. This material may suffer some fatigue phenomenon. The temperature within the furnace vessel will typically cycle between 300° F. and 3200° F. This fluctuating temperature change and frequent expansion and contraction of the outer surface of the pipe will cause material failure and the pipe will break.

To combat the hot spots common in high powered melt electric arc furnaces, copper is more commonly used for the pipes. Copper pipes do not suffer fatigue like steel pipes and will, therefore, deliver a much longer life expectancy. Even at the higher price of a water-cooled panel, having copper pipes, many steel makers can justify the additional expense. Because copper pipe has a higher heat transfer coefficient than steel pipe, thicker slag layers can be formed on water-cooled panels having copper pipes. This results in reduced energy losses when compared to steel water-cooled panels.

If higher gas velocities and temperatures are present, pipes can be fabricated from another steel grade with chromium and molybdenum. Such materials deliver a higher strength at elevated temperatures than the regular boiler grade water-cooled panels.

As illustrated in FIG. 12, a high velocity panel 102 is positioned under a water-cooled panel 18 containing a water-cooled oxygen injector 104 of the present invention. As will be described below, the water-cooled oxygen injector 104 provides for enhanced post combustion processes.

Figure 8:
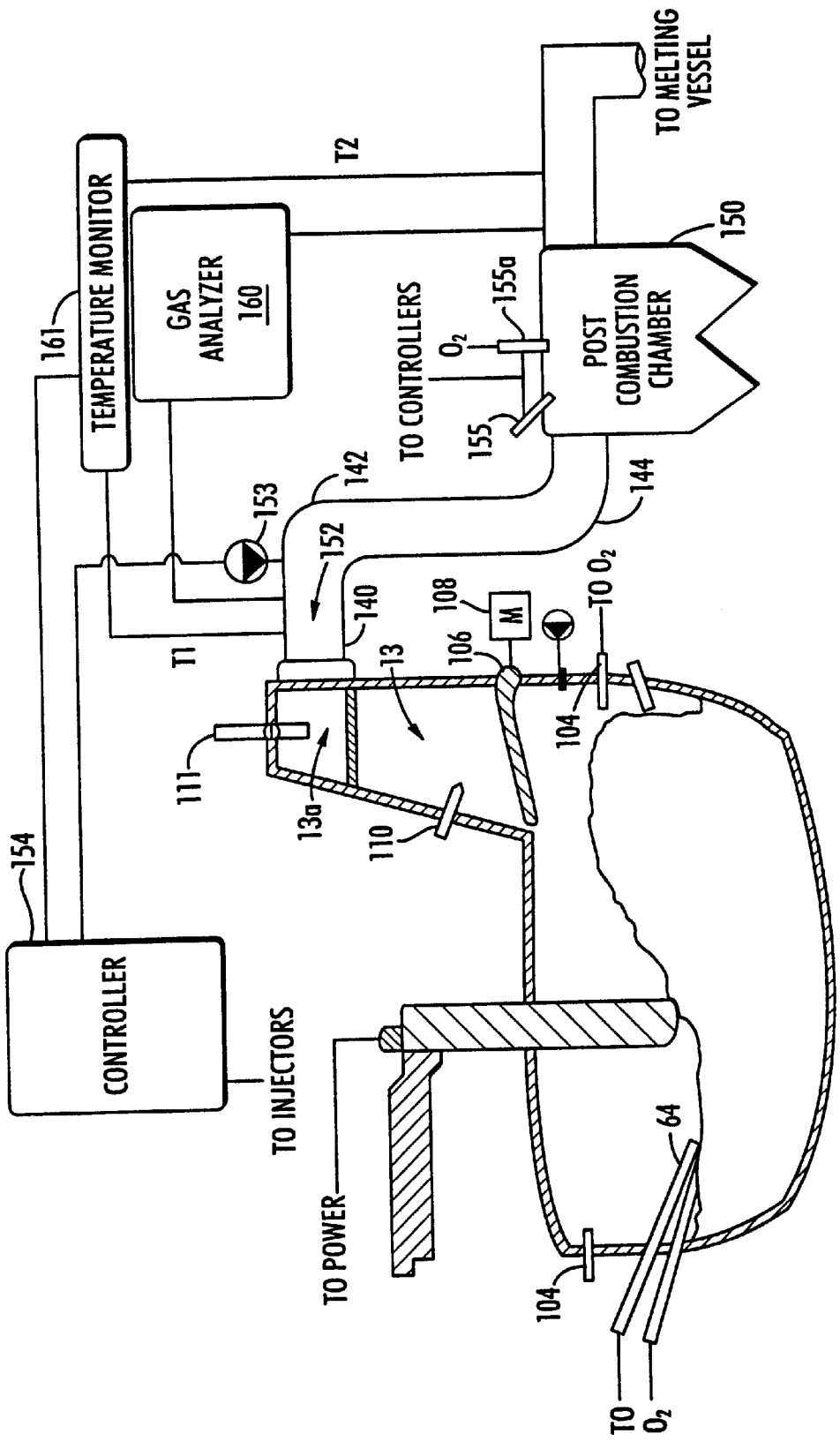
FIG. 8 is a schematic side elevation view of the electric arc furnace and post combustion chamber showing the gas analyzer and temperature monitor used for analyzing the post combustion process.

Referring now to FIG. 8, there is illustrated the electric arc furnace 10 in sectional view and the shaft 13 that extends upward from the roof. Scrap is received within the shaft 13 and held in position in the shaft 13 by a motor driven scrap plate 106. When scrap is to be discharged into the melting vessel, the motor 108 drives the scrap plate 106 downward to allow scrap to drop into the melting vessel. The oxygen lances 64 and burners 44 are illustrated which allow combustion and scrap melting. The shaft 13 also includes a shaft burner 110 and hood burner 111 in the hood 13a to preheat the scrap. As the scrap is discharged into the melting vessel, less heat is required to melt the scrap and turn the scrap into molten form.

FIG. 12 illustrates in detail a schematic cross-section view of a water-cooled panel that lines the upper vessel. As illustrated, the top water-cooled panel 18 is positioned above a high velocity panel 102. The slag line "SL" is seen at the bottom of the high velocity panel, which is designed by those skilled in the art to engage liquid metal without damaging the panel. The water channel 100 extends peripherally about the rim or top flange 20 of the melting vessel and includes two formed channels 100a, 100b that provide for the intakes 78, 80 and outlets 82, 84 of the water-cooled panels. The water channel also connects into the intake and outlet of the water-cooled oxygen injector of the present invention, as will be described in detail below.

Figure 9:
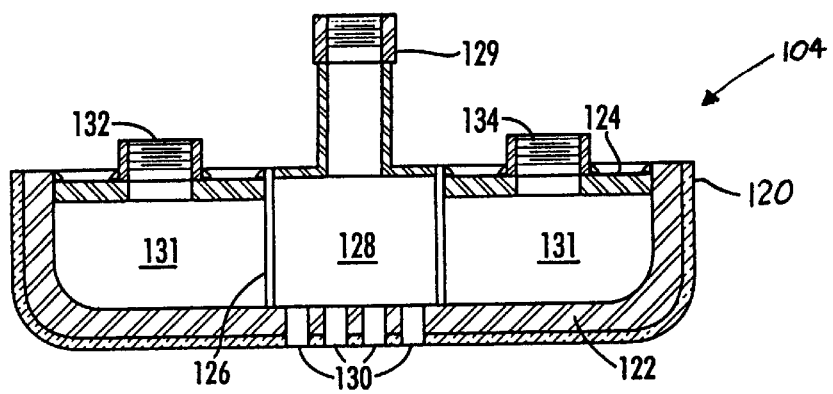
FIG. 9 is a sectional view of a water-cooled oxygen injector of the present invention taken along line 9—9 of FIG. 10.
Figure 10:
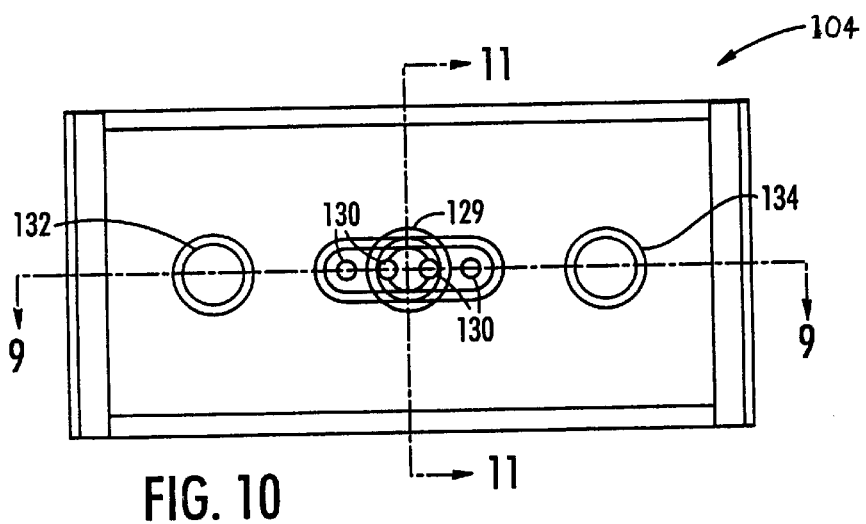
FIG. 10 is a rear elevation view of a water-cooled oxygen injector of the present invention.
Figure 11:
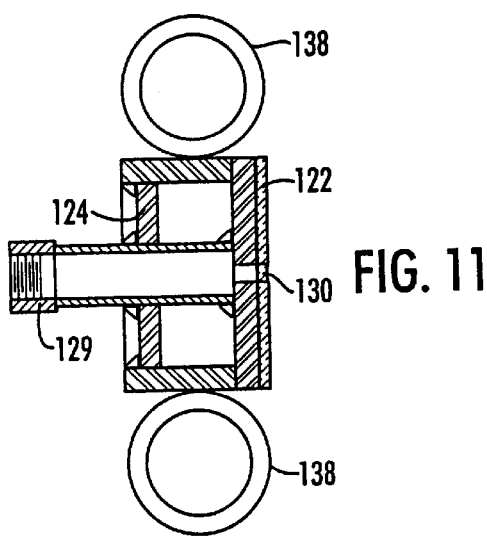
FIG. 11 is a side sectional view of the water-cooled oxygen injector taken along line 11—11 of FIG. 10 and showing on either side of the water-cooled oxygen injector, two water cooling tubes that are part of a water-cooled panel.

Referring now to FIGS. 9–11, a water-cooled oxygen injector 104 of the present invention is shown in detail. Seven injectors 104 are positioned along the melting vessel (FIG. 1). The water-cooled oxygen injector 104 of the present invention includes a substantially rectangular configured housing 120 having front and rear plates or walls 122, 124. The front wall 122 is formed as a concave member, such as a dish. The rear wall 124 forms the closure over the concave front wall 122 as illustrated in the sectional view of FIG. 9. An oval configured conduit wall 126 is received within the housing 120 and extends from the rear plate 124 to the front wall 122 as shown in FIG. 9, and forms an oxygen chamber 128, with oxygen inlet 129. Four holes 130 are drilled in the front wall 122 and form the oxygen orifices through which oxygen passes outward from the oxygen chamber 128. The balance of the area around the conduit 126 inside the oxygen injector forms a water cooling chamber 131 that surrounds the oxygen chamber. An inlet 132 and outlet 134 is formed in the rear wall 124 and allows water to pass through pipes 136 (FIG. 12) from the water channel 100 and connect to the inlet 132 and outlet 134, allowing water to pass through the water cooling chamber 131 and back into the water channel 100. FIG. 11 illustrates a water-cooled oxygen injector 104 positioned between two cooling pipes 138 formed as part of a water-cooled panel. The rectangular configuration of the injector simplifies insertion between cooling pipes and in cut holes of water-cooled panels. The configuration also facilitates replacement.

Referring now again to FIG. 8, the shaft 13 also includes the top hood 13a through which exhaust gas passes into a duct 140 and through first and second elbow joints 142, 144 into a post combustion chamber 150. Naturally, the exhaust duct 140 can be designed in any manner known to those skilled in the art.

The post combustion chamber 150 provides for post combustion of the volume of exhaust gas that passes in the duct 140, and in conjunction with a controller, allows the determination of the amount of oxygen to be injected through the injectors for use in the post combustion system of the present invention.

As illustrated, part of the exhaust duct includes a venturi 152 that constricts exhaust gas flow, and a sensor 153 that measures air velocity. The sensor 153 generates a signal to controller 154. Volume of the air can be aided by introducing argon into the melting vessel and then determining from the introduced argon, the exhaust gas volume in the elbows 142, 144 and duct 140. By knowing the exhaust gas volume, it is possible to define the weight percentage of carbon monoxide, oxygen, carbon dioxide, silicon dioxide and other exhaust gases as long as the gases are properly sensed. Thus, it is possible to know in a more controlled manner the amount of oxygen to combust carbon monoxide into carbon dioxide.

The post combustion system further includes a gas analyzer 160 that not only analyzes carbon monoxide and other gases at the beginning of the duct 140, but also the exhaust gas passing from the post combustion chamber 150. The gas analyzer 160 also analyzes other constituent gases such as nitrogen, carbon dioxide, pure oxygen, silicon dioxide and other gases present in the exhaust. A temperature monitor 161 also monitors the initial temperature T1 of the exhaust gas as it enters the venturi 152, and measures the temperature T2 of the exhaust gas as it exits from the post combustion chamber 150. Both the gas analyzer 160 and temperature monitor 161 can be selected and/or designed from components known to those skilled in the art.

The amount of gas and temperature is fed to the controller 154, together with other input variables, such as the type of scrap and the chemistry, the amount of pig iron, iron carbide, liquid iron and the amount of lime that is inserted into the melting vessel. The controller 154 can be computed having sufficient processing and programming capability. The controller 154 also controls a flow valve controller 162 and valves 164 associated with each water-cooled injector. The controller 154, through respective valve controllers 162 and valves 164, is able to adjust the amount of oxygen passing into the injectors (FIG. 12). The controller 154 also controls the burner 155 and nozzle 155a of post combustion chamber 150. Each water-cooled oxygen injector 104 can thus be individually controlled through the appropriate valves 164. Oxygen flow can originate from individual oxygen lines 166 coming from a common bezel ring 168 connected to a source of oxygen or other appropriate means known to those skilled in the art.

During the melt, at least a portion, and in some instances the entire amount of generated gas, passes through the exhaust duct 140 and into the post combustion chamber 150, where post combustion occurs and is measured by the appropriate temperature monitor 161 and gas analyzer 160. For example, if not enough carbon dioxide is formed from the exhaust gas in the post combustion chamber 150, the temperature in the post combustion chamber 150 can be increased. The controller 154 also controls the appropriate amount of post combustion occurring in the chamber by means of burner and injector 155a and, based on the measured input and output of the post combustion chamber, as well as the other variables, the water-cooled injectors for the melting vessel are appropriately controlled to provide post combustion and real time adjustment and control in the melting vessel. The post combustion burner also adds heat necessary for aiding in post combustion. The exhaust from the post combustion chamber can be recycled back into the melting vessel.

Typically, the water-cooled oxygen injectors 104 always have a minimum amount of oxygen flowing through them to maintain the injectors in an open and unclogged position. In the post combustion chamber, the burners should keep the off gas temperature at the exit of the refractor line near the post combustion chamber at a preset temperature. Post combustion chambers can have as many burners and injectors as necessary and required. The exhaust gas volume typically increases when the burners are at an operating point. The water flow and water temperature in the melting vessel roof and various other areas can be measured to determine energy losses. The percentage of argon is measured to determine the argon dilution from the input of argon and to calculate the exhaust gas volume. This figure could also be used to calculate the amount of oxygen needed to combust the carbon monoxide in the off gas (exhaust) to reach below a maximum tolerated carbon monoxide set point.

Negative pressure at the gap between the elbow and the duct determines the air intake of a known gap area. The venturi 152 in the dry duct can be used to calculate the volume of the gas. The gas analyzer 160 determines the carbon monoxide level when it is above a maximum level. The temperature can be increased in the post combustion chamber 150 by adding greater burner power if enough oxygen is available, and more oxygen can be added.

The controller 154 also receives the various values of the temperature, the oxygen flow in the lance, the burner power, the amount of air entering the furnace, as well as information regarding the values determined in the gas analysis before and after the post combustion chamber. It also receives energy consumption information and determines the total input of kilowatt per hour per charge ton (DRI, KG/MIN) and processes this information to determine the post combustion ratio to be achieved. Based on the values and the post combustion achieved in the post combustion chamber, the water-cooled injectors are set and varied as necessary.

Figure 13:
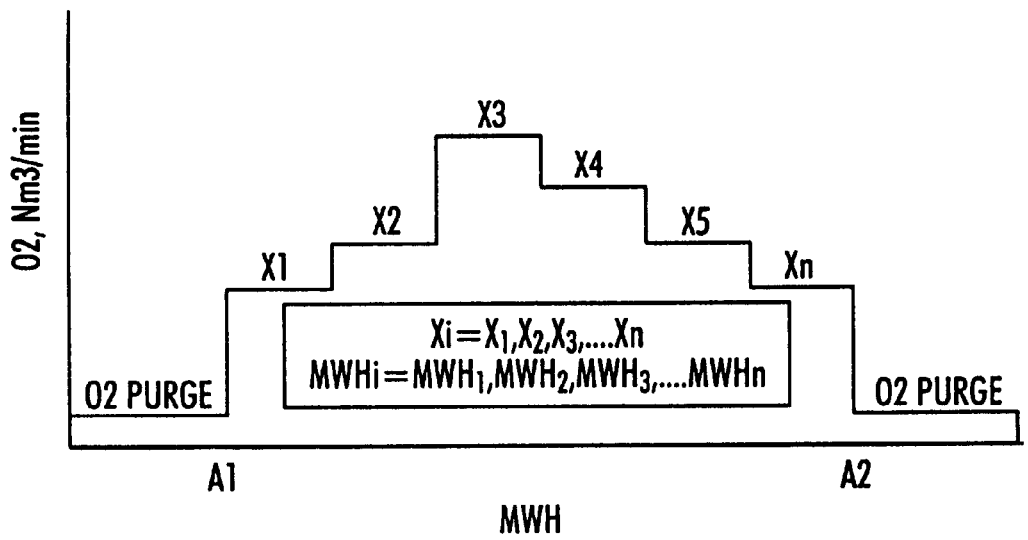
FIG. 13 is a graph of the oxygen and nitrogen flow in cubic feet per minute relative to the energy consumption.
Figure 14:
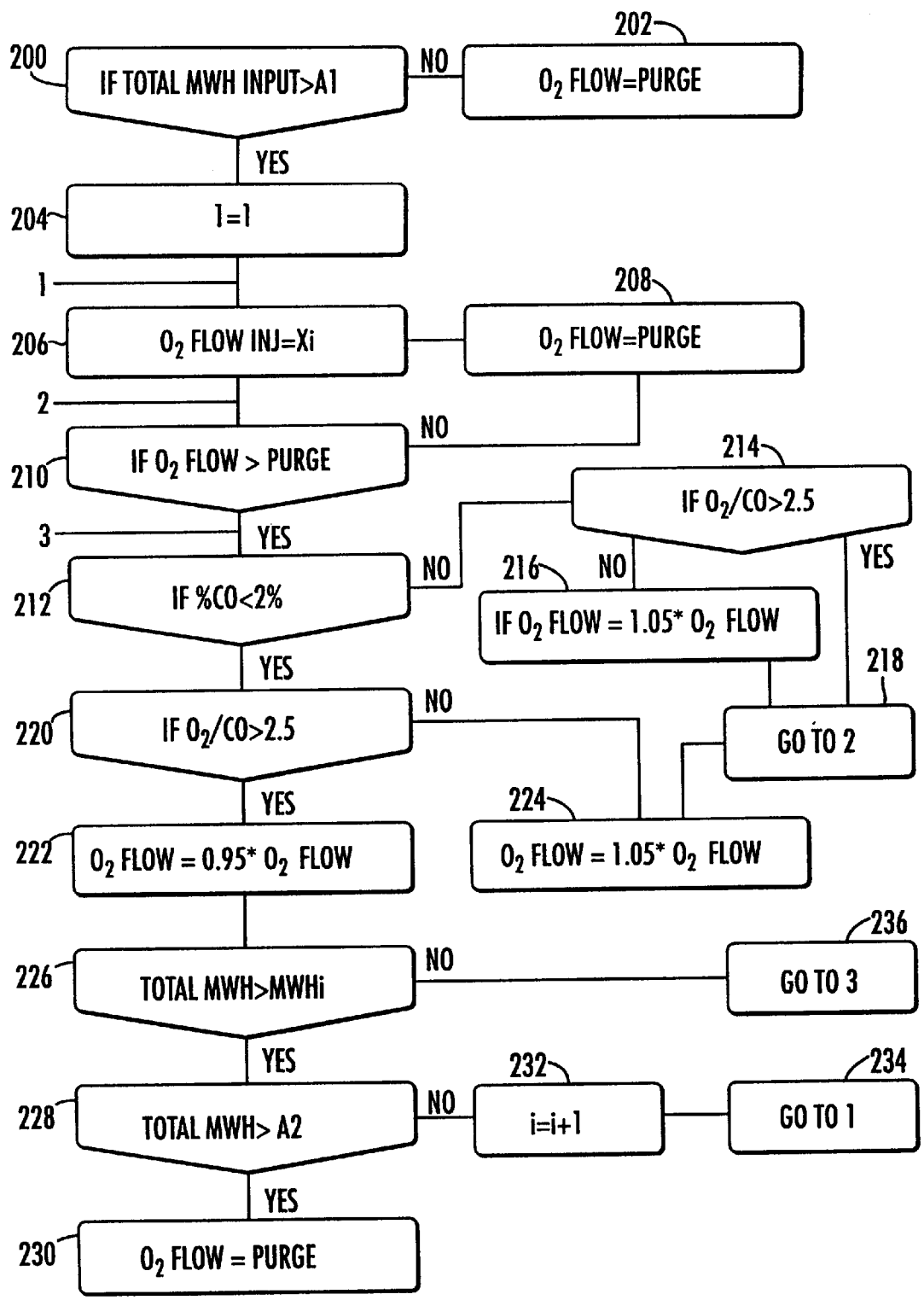
FIG. 14 is a flow chart depicting the post combustion conditions that could be used for starting post combustion and continuing post combustion in accordance with one example of the present invention.

FIG. 13 illustrates a basic graph of the milliwatts per hour and oxygen and nitrogen cubic feet flow per minute, and FIG. 14 is a chart illustrating when post combustion begins and continues. FIG. 14 only illustrates one out of many possible operating scenarios, which can vary depending on furnace design, scrap, and numerous other factors known to those skilled in the art. As shown in the chart of FIG. 13, when the milliwatts per hour is below a certain preset value A1, then oxygen flow is equal to a purge flow of oxygen in injectors. This also occurs when the milliwatts per hour exceed a greater value A2. These values are established depending on operating conditions and the type of melt as known to those skilled in the art. The flow chart illustrates a basic flow depicting conditions to start post combustion, and the percentage of carbon monoxide defined according to the desired post combustion ratio. The flow chart also establishes one routine to verify post combustion using the controller to adjust oxygen input with the lance post combustion and the injectors, as well as a routine to stop oxygen flow through the lance and injectors (e.g., through the purge).

As shown in the flow chart of FIG. 14, if the total MWH input is not greater than 1 (Block 200), the oxygen flow is equal to the purge level of the oxygen flow (Block 202), which is determined by one skilled in the art. The purge level is an amount sufficient to maintain injector clarity. If the total MWH input is greater than the value set for A1, then i=1 (Block 204). The oxygen flow injection equals Xi (Block 206). If it does not, then the oxygen flow is at a purge level (Block 208). If the oxygen flow is greater than the purge level (Block 210), then the controller checks to determine if the carbon monoxide percentage is less than 2% (Block 212). If it is not less than 2%, then the controller determines if the oxygen/carbon monoxide level is greater than 2.5 (Block 214). If it is not, then the oxygen flow is increased to equal 1.05 of the oxygen flow (Block 216). At this time, the routine returns to step 2 (Block 218) and can be incremented by one.

If the percentage of carbon monoxide is less than 2% (Block 212) and the oxygen/carbon monoxide concentration is greater than 2.5 (Block 220), then the oxygen flow is reduced 0.95 of oxygen flow (Block 222). If the oxygen/carbon monoxide is not greater than 2.5, then oxygen flow is increased 1.05 of oxygen flow (Block 224), and step 2 (Block 218) repeated. If the total milliwatts per hour is greater than the milliwatts at Hi (Block 226) and the total megawatts per hour is greater than the A2 level (Block 228), then the oxygen flow becomes purge value (Block 230). If the total megawatts per hour is not greater than A2, then the steps are incremented by one (Block 232) and the process moves to step 1 (Block 234). IF the total MWH is not greater than MWHi, the process moves to step 3 (Block 236).

It is evident that the present invention now allows for post combustion to be enhanced through the use of the post combustion chamber where temperature and gas can be monitored. Post combustion occurs in the post combustion chamber, which can be measured and analyzed on a real time basis to adjust oxygen flow within the melting vessel. Post combustion chamber exhaust can be recycled back into the melting vessel. The improved water-cooled oxygen injectors provide greater control over the post combustion system.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An electric arc furnace comprising:
    a melting vessel having interior walls and a roof that is configured to permit the charging of metal to be molten into the melting vessel;
    at least one electrode extending into the melting vessel for generating an electric arc and forming a molten metal bath;
    at least one oxygen lance that can be extended into the melting vessel for injecting oxygen into the molten metal bath and creating a reaction where carbon monoxide is generated;
    a plurality of oxygen injectors positioned along the interior walls of the melting vessel that inject post combustion oxygen into the melting vessel, said oxygen injectors having a oxygen purge level flow;
    an exhaust vent through which exhaust gas is exhausted from the melting vessel;
    a post combustion chamber for receiving the exhaust gas, and including a burner and oxygen injector for providing post combustion of the exhaust gas within the post combustion chamber;
    an exhaust gas return extending from the post combustion chamber back into the melting vessel for returning at least a portion of the exhaust gas from the post combustion chamber into the melting vessel;
    at least one gas analyzer for measuring a concentration of carbon monoxide gas and oxygen contained within the exhaust gas from the melting vessel and for measuring a concentration of carbon monoxide gas and oxygen to be returned from the post combustion chamber back into the melting vessel to determine the percentage concentration of carbon monoxide gas and oxygen/carbon monoxide concentration ratio; and
    a controller operatively connected to the gas analyzers and the plurality of oxygen injectors within the melting vessel and post combustion chamber, wherein said controller is operative to increase post combustion flow of oxygen through the oxygen injectors of the melting vessel when the oxygen flow through the oxygen injectors is greater than purge level flow and the concentration of carbon monoxide gas contained within the exhaust gas from melting vessel greater than about 2% and the oxygen/carbon monoxide concentration ratio is less than about 2.5, and operative to reduce the post combustion flow of oxygen when the concentration of carbon monoxide gas is less than about 2% and the oxygen/carbon monoxide concentration ratio is greater than 2.5.

2. An electric arc furnace according to claim 1, wherein the oxygen flow is adjusted to increase by about 1.05 when the concentration of carbon monoxide gas contained within the exhaust gas from melting vessel is greater than about 2%, and the oxygen/carbon monoxide concentration ratio is less than about 2.5.

3. An electric arc furnace according to claim 1, wherein the oxygen flow is adjusted to decrease by about 0.95 when the concentration of carbon monoxide gas contained within the exhaust gas from the melting vessel is less than about 2%, and the oxygen/carbon monoxide concentration ratio is greater than 2.5.

4. An electric arc furnace according to claim 1, wherein the oxygen flow is equal to about purge flow within the oxygen injectors when the energy input is below a predetermined value, or the energy input is greater than a second predetermined value.

5. An electric arc furnace according to claim 1, wherein said roof is removable to aid in charging of metal to be molten.

6. An electric arc furnace according to claim 1, wherein said melting vessel further comprises a slag door portion defining a slag discharge opening through which slag can be discharged from the melting vessel.

7. An electric arc furnace according to claim 6, and further comprising an arcuate configured water-cooled panel positioned above the slag door portion.

8. An electric arc furnace according to claim 6, and further comprising at least one oxygen lance that can be extended through the slag door portion into the melting vessel for injecting oxygen into the molten metal bath to create a reaction where carbon monoxide is generated.

9. An electric arc furnace according to claim 1, and further comprising an argon injector for injecting argon into the melting vessel, wherein said at least one gas analyzer measures the argon gas concentration such that said controller determines a volume of exhaust gas from the melting vessel based on the measured argon gas concentration.

10. An electric arc furnace comprising:
   a melting vessel having a lower shell formed of a refractory material and an upper shell having interior walls formed from a plurality of water-cooled panels that define the interior walls, and a roof that is configured to permit the charging of metal to be molten into the melting vessel;
   at least one electrode extending into the melting vessel for generating an electric arc and forming a molten metal bath;
   at least one oxygen lance that can be extended into the melting vessel for injecting oxygen into the molten metal bath and creating a reaction where carbon monoxide is generated;
   a plurality of oxygen injectors positioned along the interior walls of the melting vessel that inject post combustion oxygen into the melting vessel, said oxygen injectors having a oxygen purge level flow;
   an exhaust vent through which exhaust gas is exhausted from the melting vessel;
   a post combustion chamber for receiving the exhaust gas, and including a burner and oxygen injector for providing post combustion of the exhaust gas within the post combustion chamber;
   an exhaust gas return extending from the post combustion chamber back into the melting vessel for returning at least a portion of the exhaust gas from the post combustion chamber back into the melting vessel;
   at least one gas analyzer for measuring a concentration of carbon monoxide gas and oxygen contained within the exhaust gas from the melting vessel and for measuring a concentration of carbon monoxide gas and oxygen to be returned from the post combustion chamber back into the melting vessel to determine the percentage concentration of carbon monoxide gas and oxygen/carbon monoxide concentration ratio; and
   a controller operatively connected to the at least one gas analyzer and the plurality of oxygen injectors within the melting vessel and post combustion chamber, wherein said controller is operative to increase post combustion flow of oxygen through the oxygen injectors of the melting vessel when the oxygen flow through the oxygen injectors is greater than purge level flow and the concentration of carbon monoxide gas contained within the exhaust gas from the melting vessel is greater than about 2%, and the oxygen/carbon monoxide concentration ratio is less than about 2.5, and operative to reduce the post combustion flow of oxygen when the concentration of carbon monoxide gas is less than about 2% and the oxygen/carbon monoxide concentration ration is greater than about 2.5.

11. An electric arc furnace according to claim 10, wherein the oxygen flow is adjusted to increase by about 1.05 when the concentration of carbon monoxide gas contained within the exhaust gas from melting vessel greater than about 2% and the oxygen/carbon monoxide concentration ratio is less than about 2.5.

12. An electric arc furnace according to claim 10, wherein the oxygen flow is adjusted to decrease by about 0.95 when the concentration of carbon monoxide gas contained within the exhaust gas from the melting vessel is less than about 2%, and the oxygen/carbon monoxide concentration ratio is greater than 2.5.

13. An electric arc furnace according to claim 10, wherein the oxygen flow is equal to about purge flow within the oxygen injectors when the energy input is below a predetermined value, or the energy input is greater than a second predetermined value.

14. An electric arc furnace according to claim 10, wherein said roof is removable to aid in charging of metal to be molten.

15. An electric arc furnace according to claim 10, wherein said melting vessel further comprises a slag door portion defining a slag discharge opening through which slag can be discharged from the melting vessel.

16. An electric arc furnace according to claim 15, and further comprising an arcuate configured water-cooled panel positioned above the slag door portion.

17. An electric arc furnace according to claim 15, and further comprising at least one oxygen lance that can be extended through the slag door portion into the melting vessel for injecting oxygen into the molten metal bath to create a reaction where carbon monoxide is generated.

18. An electric arc furnace according to claim 10, and further comprising an argon injector for injecting argon into the melting vessel, wherein said at least one gas analyzer measures the argon gas concentration such that said controller determines a volume of exhaust gas from the melting vessel based on the measured argon gas concentration.

19. A method of operating an electric arc furnace comprising the steps of:
   generating an electric arc by at least one electrode extending through the roof of a melting vessel of the electric arc furnace to form a molten metal bath;
   extending the oxygen lance into the melting vessel and injecting oxygen into the molten metal bath to create a reaction where carbon monoxide is generated;
   exhausting gas from the melting vessel;
   receiving the exhaust gas into a post combustion chamber having a burner and oxygen injector for providing post combustion of the exhaust gas within the post combustion chamber;
   returning at least a portion of the exhaust gas from the post combustion chamber back into the melting vessel after post combustion within the post combustion chamber;
   measuring the concentration of carbon monoxide gas and oxygen contained within the exhaust gas from the melting vessel;

measuring the concentration of carbon monoxide gas and oxygen to be returned from the post combustion chamber back into the melting vessel;

determining the percentage concentration of carbon monoxide gas and oxygen/carbon monoxide concentration ratio based on the measured concentrations of carbon monoxide gas and oxygen; and increasing the post combustion flow of oxygen through the oxygen injectors of the melting vessel when the concentration of carbon monoxide gas contained within the exhaust gas from the melting vessel is greater than about 2% and the oxygen/carbon monoxide concentration ratio is less than about 2.5, and reducing the post combustion flow of oxygen when the concentration of carbon monoxide gas is less than about 2% and the oxygen/carbon monoxide concentration ratio is greater than about 2.5.

20. A method according to claim 19, and further comprising the step of increasing the oxygen flow by about 1.05 when the concentration of carbon monoxide gas contained within the exhaust gas from melting vessel is greater than about 2% and the oxygen/carbon monoxide concentration ratio is less than about 2.5.

21. A method according to claim 19, and further comprising the step of decreasing the oxygen flow by about 0.95 when the concentration of carbon monoxide gas contained within the exhaust gas from the melting vessel is less than about 2% and the oxygen/carbon monoxide concentration ratio is greater than 2.5.

22. A method according to claim 19, and further comprising the step of extending at least one oxygen lance through a slag door portion into the melting vessel for injecting oxygen into the molten metal bath to create a reaction where carbon monoxide is generated.

* * * * *